United States Patent Office 3,597,407
Patented Aug. 3, 1971

3,597,407
DIENE POLYMERIZATION WITH ORGANOMETAL AND IRON COMPLEX
Henry L. Hsieh, Bartlesville, Okla., assignor to Phillips Petroleum Company
No Drawing. Original application Dec. 7, 1964, Ser. No. 416,607, now Patent No. 3,475,395, dated Oct. 28, 1969. Divided and this application June 11, 1969, Ser. No. 832,444
Int. Cl. C08d 3/06
U.S. Cl. 260—94.3
10 Claims

ABSTRACT OF THE DISCLOSURE

Polymers of conjugated dienes are prepared by contacting the monomer system with a catalyst which forms on mixing (1) a compound selected from the group consisting of certain organozic and organoaluminum compounds and (2) the reaction product of an iron salt with an N.N-dimethylamide of a fatty acid.

This application is a division of my copending application Ser. No. 416,607, filed Dec. 7, 1964, now Pat. No. 3,475,395.

This invention relates to catalyst compositions, a polymerization process, and the products produced thereby. In a further aspect, this invention relates to the production of polymers prepared solely from conjugated dienes.

The following are objects of this invention.

An object of my invention is to provide new catalyst compositions.

A further object of my invention is to provide a new polymerization process for the production of polymers prepared solely from conjugated dienes.

Other objects and advantages of this invention will be apparent to one skilled in the art upon reading this disclosure.

Broadly, the invention resides in a process for preparing polymers prepared solely from conjugated dienes comprising contacting the monomer system with a catalyst which forms on mixing (1) a compound selected from the group consisting of organozic and organoaluminum compounds of the formula

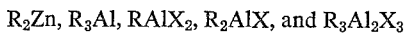

$R_2Zn$, $R_3Al$, $RAlX_2$, $R_2AlX$, and $R_3Al_2X_3$ where R is selected from the group consisting of saturated aliphatic, saturated cycloaliphatic and aromatic radicals containing 1 to 20 carbon atoms, and X is halogen and (2) the reaction product of an iron salt with an N,N-dimethylamide of a fatty acid.

Examples of the organozinc and organoaluminum compounds which are suitable include dimethylzinc, diethylzinc, di-n-propylzinc, diisopropylzinc, di-n-butylzinc, diisobutylzinc, di-n-amylzinc, the diisoamylzincs, di-n-hexylzinc, di-n-octaylzinc, di-n-dodecylzinc, dicyclopentylzinc, dicyclohexylzinc, di(2-5-dimethylcyclopentyl)zinc; di(3,5-dimethylcyclohexyl)zinc, diphenylzinc, the ditolylzincs, the dixylyzincs, di(2-hexyltetradecyl)zinc, di(4-cyclohexyloctyl)zinc, di(2-butylcyclohexyl)zinc, di(2,4,8-trimethylhendecyl)zinc, di(7-pentyltetradecyl)zinc, di[2-(2,3,5-tributylphenyl)ethyl]zinc, dibenzylzinc, di(4,6-dicyclopentyldecyl)zinc, methylethylzinc, ethylisopropylzinc, n-propyl-n-hexylzinc, trimethylaluminum, triethylaluminum, tri-n-propylaluminum, triisopropylaluminum, tri-n-butylaluminum, tricyclohexylaluminum, triphenylaluminum, tribenzylaluminum, dimethylaluminum fluoride, diethylaluminum fluoride, diethylaluminum chloride, diisobutylaluminum chloride, di-n-octaylaluminum chloride, dimethylaluminum bromide, diethylaluminum bromide, diethylaluminum iodide, diisobutylaluminum iodide, methylaluminum difluoride, ethylaluminum difluoride, n-propylaluminum difluoride, octylaluminum difluoride, methylaluminum dichloride, ethylaluminum dichloride, isobutylaluminum dichloride, phenylaluminum dichloride, methylcyclohexylaluminum dichloride, methylaluminum diiodide, isobutylaluminum diiodide, methylaluminum sesquifluoride, ethylaluminum sesquichloride, n-propylaluminum sesquichloride, methylaluminum sesquibromide, ethylaluminum sesquiiodide, etc.

The second component used for preparing the catalyst is the compound of iron.

Specific examples include ferrous chloride, ferric chloride, ferric bromide, ferrous iodide, ferric oxychloride, ferrous thiocyanate, ferric thiocyanate, ferrous acetate, ferric acetate, ferric butyrate, ferrous octoate, ferric laurate, or ferrous stearate reacted with an N,N-disubstituted fatty acid amide. Illustrative of the fatty acid amides useful for this purpose are the N,N-dimethylamides of $C_6$ to $C_{20}$ saturated and unsaturated fatty acids marketed by C. P. Hall Company and designated as Hallcomids. Specific examples of the foregoing types of materials which can be used in the catalyst preparation include N,N-dimethylcaprylamide, N,N-dimethyllauramide, N,N-dimethylmyristamide, N,N-dimethylpalmitamide, N,N-dimethylstearamide, N,N-dimethyloleamide, and N,N-dimethyllinoleamide.

The mole ratio of organometallic compound to the iron compound in the catalyst composition can vary over a broad range, i.e., from 1:1 to 50:1.

The catalyst level is ordinarily based on the organometallic component, i.e., the organoaluminum or organozinc compound. It will generally be in the range of one to 100 millomoles per 100 grams monomers, preferably in the range of 5 to 40 millimoles per 100 grams monomers.

Polymerization temperature is usually in the range of −100 to 250° F. Preferred temperature is in the range of 0 to 200° F.

HOMOPOLYMERS OF CONJUGATED DIENES

Conjugated dienes polymerized in accordance with the present process to produce homopolymers are preferably those containing frim 4 to 12 carbon atoms per molecule and include 1,3-butadiene, isoprene, 1,3-pentadiene, 2,3-dimethyl-1,3-butadiene, 1,3-hexadiene, 1,3-dodecadiene chloroprene, 2-methoxy-1,3-butadiene, etc. If desired, mixtures of two or more conjugated dienes can be employed.

In order to be effective as catalysts, or initiators, for the polymerization of conjugated dienes, it is generally necessary that the catalyst posses some measure of solubility in the diluent employed for the polymerization. Ferric chloride is not soluble to any extent in the hydrocarbons, but if it is brough into contact with an N,N-disubstituted fatty acid amide such as the Hallcomid products described above, a hydrocarbon-soluble product is formed. When this product is blended with an organozinc or organoaluminum compound as set forth above, an active initiator for the polymerization of conjugated dienes is produced.

The mole ratio of organometallic compound to ferric chloride can vary over a broad range, i.e., from 3:1 to 50:1, preferably from 5:1 to 30:1.

The diene products are high molecular weight, rubbery polymers. Polybutadiene produced by this process contains less than 10 percent trans-1,4-addition, 25 to 35 percent 1,2-addition (vinyl), and 58 to 72 percent cis-1,4-addition polymer. Polyisoprene contains 35 to 45 percent 3,4-addition, the remainder being predominantly cis polymer.

The following example illustrates specific embodiments of the invention. It should not be considered unduly limiting.

Example

Runs were made in which butadiene and isoprene were each polymerized in the presence of a catalyst formed on mixing triisobutylaluminum with a complex of ferric chloride and an N,N-dimethylamide derived from a mixture of $C_6$ to $C_{12}$ fatty acids (Hallcomid M 8–10). Polymerization recipes were as presented in the following table.

|  | A | B | C | D |
|---|---|---|---|---|
| 1,3-butadiene, parts by weight | 100 | 100 | | |
| Isoprene, parts by weight | | | 100 | 100 |
| Toluene, parts by weight | 860 | | 860 | |
| Cyclohexane, parts by weight | | 780 | | 780 |
| Triisobutylaluminum, mhm | 20 | 20 | 30 | 30 |
| Ferric chloride·amide complex,[1] mhm | (2) | (2) | (2) | (2) |
| Temperature, °F | 41 | 41 | 41 | 41 |
| Time, hours | 20 | 16 | 20 | 20 |

[1] One mole of $FeCl_3$ was dissolved in 4 moles of the N,N-dimethylamide and the mixture was then diluted with toluene to make a 0.5 M solution.
[2] Variable.

NOTE.—mhm=gram millimoles per 100 grams monomer

The diluent was charged first and the reactor was then purged with nitrogen. The monomer was added followed by the triisobutylaluminum and finally the ferric chloride amide complex compound. At the conclusion of the polymerization, the reactions were shortstopped with 2,2′-methylene-bis(4-methyl-6-tert-butylphenol) dissolved in a mixture containing equal parts by volume of isopropyl alcohol and toluene. The amount of solution used was suffiicent to provide approximately one part by weight of the phenolic antioxidant per 100 parts by weight polymer. The polymer was then coagulated in isopropyl alcohol, separated and dried. Rubbery products were obtained in all cases. Results of the runs are presented in the following table.

was calculated according to the following equation and consistent units:

$$\epsilon = E/tc$$

where $\epsilon$=extinction coefficient (liters-mols$^{-1}$ centimeters$^{-1}$); $E$=extinction (log $I_0/I$); $t$=path length (centimeters); and $c$=concentration (mols double bond/liter). The extinction was determined at the 10.35 micron band. The extinction coefficient was 146 (liters-mols$^{-1}$ centimeters$^{-1}$).

The percent of the total unsaturation present as 1,2-(vinyl) was calculated according to the above equation, using the 11.0-micron band. The extinction coefficient was 209 (liters-mols$^{-1}$ centimeters$^{-1}$).

The percent of the total unsaturation present as cis 1,4- was obtained by subtracting the trans 1,4- and 1,2-(vinyl) determined according to the above procedure, from the theoretical unsaturation, assuming one double bond per each $C_4$ unit in the polymer.

For the determination of the microstructure of polyisoprene solutions containing 25 grams of polymer per liter of solution were prepared. Calibrations were based on deprotenized natural rubber as a reference material, assuming that it contained 98 percent cis and 2 percent 3,4-addition product. The cis was measured at the 8.9 micron band and the 3,4-addition at the 11.25 micron band.

In the polymerization recipes, the term "mhm" is gram millimoles per 100 grams of monomer(s).

Unsaturation was determined by iodine chloride titration as follows: A 0.5 gram sample of polymer was dissolved in a 75/25 volume mixture of carbon disulfide and chloroform, a chloroform solution of iodine chloride of known concentration (approximately 0.09–0.10 molar) was added, the mixture was placed in a 25° C. bath for one hour to allow time for reaction, and the excess of iodine chloride was titrated with 0.05 N sodium thiosul-

| Run No. | Run from recipe | FeCl₃·amide complex, mhm. | Conv., percent | Inh. visc. | Gel, percent | Microstructure, percent | | |
|---|---|---|---|---|---|---|---|---|
| | | | | | | Cis | Trans | Vinyl |
| 1 | A | 1 | 11 | 15.34 | 0 | 69.4 | 0.5 | 30.1 |
| 2 | A | 2 | 11 | 14.98 | 2 | 69.0 | 0.9 | 30.0 |
| 3 | A | 3 | 10 | 15.11 | 7 | 68.9 | 1.1 | 30.1 |
| 4 | A | 4 | 11 | 13.61 | 0 | 63.0 | 6.9 | 30.1 |
| 5 | B | 0.5 | 5 | 17.16 | 0 | 71.3 | 0.5 | 28.2 |
| 6 | B | 1 | 4 | 15.38 | 0 | 70.0 | 0.5 | 29.5 |
| 7 | B | 1.5 | 5 | 14.02 | 0 | 69.6 | 0.5 | 29.9 |
| 8 | B | 2 | 7 | 14.41 | 0 | 69.2 | 0.5 | 30.3 |
| 9 | C | 1 | 5 | | | | | [1] 39.5 |
| 10 | C | 2 | 5 | 12.6 | 0 | | | |
| 11 | C | 3 | 5 | 11.9 | 0 | | | |
| 12 | D | 1 | 5 | | | | | [1] 40.3 |
| 13 | D | 2 | 5 | 11.4 | 0 | | | |

[1] 3,4-addition; remainder predominantly cis.

The data show that all polymers had a very high inherent viscosity (high molecular weight). Except for run 4 which contained 6.9 percent trans-1,4-addition polymer, the polybutadiene contained from 63 to 71.3 percent cis 28.2 to 30.3 percent 1,2-addition (vinyl), and from 0.5 to 1.1 percent trans-1,4-addition polymer. The cis: vinyl ratio in these polymers ranges from 2.1:1 in run 4 to 2.5:1 in run 5. The polyisoprene contained about 40 percent of the 3,4-addition polymer, the remainder being predominantly cis.

Samples of certain of the polymer products produced in the runs described in the example were examined by infrared analysis. This work was carried out in order to determine the percentage of the polymers formed by 1,2-addition of the butadiene. The procedure used in making these determinations is described hereinafter.

The polymer samples were dissolved in carbon disulfied to form a solution having 25 grams of polymer per liter of solution. The infrared spectrum of each of the solutions (percent transmission) was then determined in a commercial infrared spectrometer.

The percent of total unsaturation present as trans 1,4- fate. The millimoles of iodine chloride that reacted with one gram of sample was then calculated.

As many possible embodiments can be made of this invention without departing from the scope thereof, it is to be understood that all matter herein set forth is to be interpreted as illustrative and not as unduly limiting the invention.

That which is claimed is:

1. A process for polymerizing a conjugated diene monomer system comprising: contacting said monomer system under polymerization conditions with a catalyst which forms on mixing (1) a compound selected from the group consisting of organozinc organoaluminum compound of the formula $R_2Zn$, $R_3Al$, $RAlX_2$, $R_2AlX$, and $R_3Al_2X_3$ where R is selected from the group consisting of saturated aliphatic, cycloaliphatic, and aromatic radicals containing 1 to 20 carbons and X is halogen, and (2) the reaction product of an iron salt with an N,N-dimethylamide of a fatty acid.

2. A process according to claim 1 wherein said conjugated diene is selected from the group consisting of butadiene and isoprene.

3. A process according to claim 1 wherein said iron salt is ferric chloride.

4. A process according to claim 1 wherein the mole ratio of component (1) to the uncomplexed iron salt of component (2) is within the range of 3:1 to 50:1, said component (1) being used in an amount of 1 to 100 gram millimoles per 100 grams of monomer, said polymerization being carried out at a temperature −100 to 250° F.

5. A process according to claim 1 wherein said fatty acid is a mixture of $C_6$ to $C_{12}$ fatty acids.

6. A process according to claim 5 wherein said iron salt is ferric chloride.

7. A process according to claim 6 wherein said conjugated diene is selected from the group consisting of butadiene and isoprene.

8. A process according to claim 7 wherein the mole ratio of component (1) to the uncomplexed iron salt of component (2) is within the range of 3:1 to 50:1, said component (1) being used in an amount of 1 to 100 gram millimoles per 100 grams of monomer, and said polymerization being carried out at a temperature −100 to 250° F.

9. A process according to claim 8 wherein said monomer is butadiene.

10. A process according to claim 8 wherein said monomer is isoprene.

References Cited
UNITED STATES PATENTS

| | | | |
|---|---|---|---|
| 3,300,466 | 1/1967 | Marullo et al. | 260—94.3 |
| 3,415,802 | 12/1968 | Farrar | 260—94.3 |
| 3,419,505 | 12/1968 | Marsico | 260—2 |
| 3,462,403 | 8/1969 | Pendleton | 260—93.7 |
| 3,475,395 | 10/1969 | Hsieh | 260—88.7 |

JOSEPH L. SCHOFER, Primary Examiner

R. A. GAITHER, Assistant Examiner

U.S. Cl. X.R.

260—82.1